US007408916B2

(12) United States Patent
Kassinen et al.

(10) Patent No.: US 7,408,916 B2
(45) Date of Patent: Aug. 5, 2008

(54) SYNCHRONISATION OF FRAME TRANSMISSIONS IN A TELECOMMUNICATIONS NETWORK

(75) Inventors: Juha P. Kassinen, Oulu (FI); Jari Parkkinen, Oulu (FI); Kari Niemela, Oulu (FI); Heikki Annala, Oulu (FI); Juan Melero, Malaga (ES)

(73) Assignee: Nokia Corporation, Espoo (FI)

( * ) Notice: Subject to any disclaimer, the term of this patent is extended or adjusted under 35 U.S.C. 154(b) by 813 days.

(21) Appl. No.: 10/296,618

(22) PCT Filed: Apr. 26, 2001

(86) PCT No.: PCT/FI01/00400

§ 371 (c)(1),
(2), (4) Date: Apr. 9, 2003

(87) PCT Pub. No.: WO01/93460

PCT Pub. Date: Dec. 6, 2001

(65) Prior Publication Data

US 2003/0156575 A1      Aug. 21, 2003

(30) Foreign Application Priority Data

May 30, 2000   (FI)   .................................. 20001298

(51) Int. Cl.
*H04J 3/06*  (2006.01)
(52) U.S. Cl. ...................... 370/350; 455/502; 455/503; 375/355; 375/357
(58) Field of Classification Search ................. 370/345, 370/503, 252, 335, 338, 350, 508, 509, 328; 455/502, 427, 422, 456
See application file for complete search history.

(56) References Cited

U.S. PATENT DOCUMENTS 5,245,634 A * 9/1993 Averbuch ..................... 375/357

(Continued)

FOREIGN PATENT DOCUMENTS

EP         0 668 667 A1      8/1995

(Continued)

OTHER PUBLICATIONS

GSM 08.31 V7.0.1 (Jan. 2000) Digital Cellular Telecommunications System (Phase 2+); Location Services (LCS); Serving Mobile Location Centre—Serving Mobile Location Centre—Serving Mobile Location Centre (SMLC-SMLC); SMLCPP specification (GSM 08.31 version 7.0.1 Release 1998), p. 6.

(Continued)

*Primary Examiner*—Chi H. Pham
*Assistant Examiner*—Albert T Chou
(74) *Attorney, Agent, or Firm*—Squire, Sanders & Dempsey, L.L.P.

(57) ABSTRACT

The invention concerns a method for synchronising clocks of base transceiver stations in a telecommunications system and a mobile communications system. According to the invention, in either some or in all base station sites of the telecommunications network a location measurement unit is installed, which receives an accurate clock including an extra-system signal. The clock information is transmitted further to base transceiver stations, whose frame transmissions are synchronised in accordance with the clock information. By using the implementation in accordance with the invention both economic and functional advantages are achieved, e.g. the capacity can be increased by up to 50-300%, depending on the manner of implementation.

17 Claims, 5 Drawing Sheets

U.S. PATENT DOCUMENTS

| | | | | |
|---|---|---|---|---|
| 5,734,985 | A | * | 3/1998 | Ito et al. ............... 455/503 |
| 5,872,774 | A | * | 2/1999 | Wheatley et al. ......... 370/335 |
| 5,930,722 | A | * | 7/1999 | Han et al. ............... 455/502 |
| 6,009,085 | A | | 12/1999 | Lechner ................. 370/324 |
| 6,256,507 | B1 | * | 7/2001 | Lemieux ................. 455/502 |

FOREIGN PATENT DOCUMENTS

| | | | |
|---|---|---|---|
| EP | 0 848 508 A2 | * | 6/1998 |
| WO | WO 94/08405 | | 4/1994 |
| WO | WO 98/04064 | | 1/1998 |
| WO | WO 99/50985 | | 10/1999 |
| WO | WO 00/13355 | | 3/2000 |

OTHER PUBLICATIONS

Finnish Search Report.

* cited by examiner

SYNCHRONISATION OF FRAME TRANSMISSIONS IN A TELECOMMUNICATIONS NETWORK

FIELD OF THE INVENTION

The invention relates to synchronisation of a mobile network, especially to synchronisation of transmissions over the air interface.

TECHNICAL BACKGROUND

At the present time special attention is paid in several different countries to the satellite-based localisation of mobile stations and to various services relating to localisation. For example, in the United States of America the authorities have established a time limit, by which mobile stations must include a localisation system, with the aid of which a call received by an emergency station can be localised with an accuracy of approximately one hundred meters. Mobile stations with an integrated GPS-based (Global Positioning System) localisation system are already commercially available.

In practice, such a GPS receiver is integrated into the mobile station, which receives signals transmitted by satellites and which calculates its location with the aid of information contained in the signal. The GPS satellite transmits two different carrier wave frequencies. Two pseudo random signals (a C/A code and a P code intended for military use) and a navigation message are modulated into the carrier waves. The code messages do not contain actual information, but they are pseudo random sequences including a +1 and a −1 space and they are used for modulating the carrier wave. In addition, such a navigation message is modulated into the carrier wave, which contains information related to determination of the location. The length of its frame is 1500 bits, and the frame is divided into five sub-frames, all of an equal length. The frame includes e.g. clock correction information, check bits, information on the age of data, on the orbits of satellites and on the location of satellites at different times.

Continuous three-dimensional localisation requires no less than four simultaneously visible satellites. The determination of location is based on a determination of the distance between receiver and the group of satellites. The location can be determined with the aid of at least three satellites, whereby the fourth is mainly needed to eliminate deviations caused by clock errors.

Since the signal transmitted by a satellite is accompanied by information on the time of departure of the signal, the receiver is able to calculate the signal's transit time from the difference between its own clock time and the satellite's clock time. The distance of the satellite can hereby be determined, by multiplying the signals transit time by the signal's velocity, that is, by the velocity of light.

There are several different kinds of GPS signal receivers. The differences relate e.g. to whether the receiver is a single-frequency receiver or a two-frequency receiver, whether the receiver observes several satellites constantly or each satellite alternately, and what kind of code it identifies. The number of channels is an important feature of the receiver. This means how many satellites the receiver is able to observe simultaneously. The channels may be implemented either at equipment level or by software.

To allow as accurate a time determination as possible, the satellite includes a cesium clock, with which it takes more than two hours for one nanosecond to accrue. The clock error is taken into account by transmitting the clock error information coded into the signal. The clock of the receiver is usually a quartz crystal, which is less accurate than the atomic clock. With the quartz crystal it takes only a second for a nanosecond error to accrue, and its errors are more difficult to foretell. The clock error can be corrected, either by having the receiver update its clock when the error has grown to a certain predetermined value, or by using an external stable source of frequency.

Figure 1:
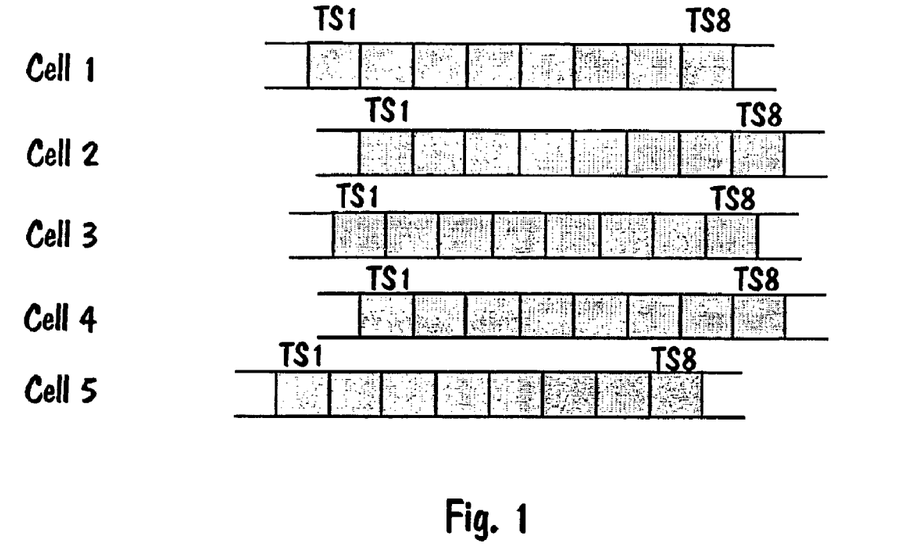
FIG. 1 shows frame transmissions of various cells in a non-synchronised system.

Localisation of a mobile station does not require synchronised networks. Base transceiver stations are independent of each other, so the frames transmitted by them are not in synchrony with each other. In other words, base transceiver stations are not aware of the starting time of the frames they transmit. This drawback is due to the fact that no reliable reference clock has been available so far for implementing synchronisation. In a non-synchronised network, the various frames will cause such interference to one another, which may at worst destroy several time slots. FIG. 1 illustrates the present situation, where base transceiver stations located in the cells (cell 1-cell 5) of a cellular network transmit frames over the air interface in a non-synchronised network. As can be seen in the figure, the time slots TS1-TS8 of the frames are not mutually matched. It is impossible to know which frequencies are interfering with what, and the base station controller is unable to calculate the mutual timings of the frames transmitted by the cells.

Figure 2:
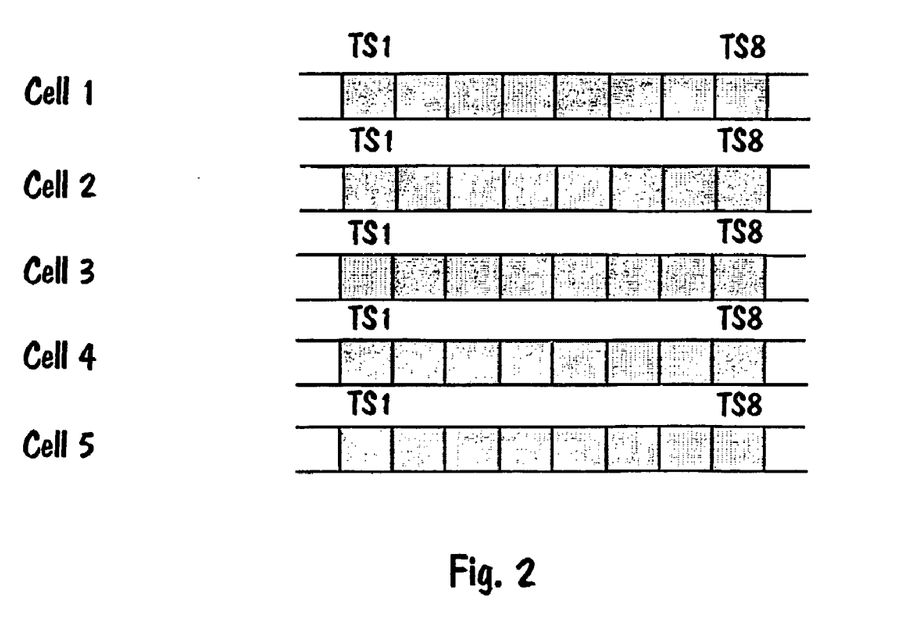
FIG. 2 shows frame transmission of various cells in a synchronised system.

The above-mentioned drawback can be reduced considerably, if the frame transmissions to be transmitted at the air interface are synchronised. In a synchronised network, no more than one time slot is lost in the worst case. FIG. 2 illustrates broadcasting of frames in a synchronised network. When the frames are exactly matched, e.g. allocation of channels can be done exactly on a time slot basis.

For the localisation function, measuring equipment will be installed in the future in the mobile network at the locations of base transceiver stations for localisation of mobile stations. In accordance with the present invention, these pieces of equipment can be utilised also for synchronisation of frame transmissions at the air interface in a mobile network. The solution is economically advantageous, because no separate equipment is required for the synchronisation only.

BRIEF SUMMARY OF THE INVENTION

The invention aims at synchronising frame transmissions over the air interface in a mobile network. In practice, this means transmissions between base transceiver stations and transmissions between a mobile station and base transceiver stations.

The established aims are achieved in such a way that at the locations of base transceiver stations such a measuring unit is installed for localisation of the mobile station, which includes a receiver for receiving a signal transmitted from a satellite. It is sufficient for the location measurement unit to detect just one satellite orbiting the earth.

In accordance with a first embodiment of the invention, the location measurement unit is installed at each base transceiver station site. The location measurement unit synchronises is internal clock with the global clock it receives from the satellite. A certain global moment in time represents a point of reference for the starting moment of the frame clock, that is, for the clock's edge. At the point of reference, the frame number is set at zero. The location measurement unit transmits the frame number thus defined and the frame clock to the base transceiver station. The base transceiver station synchronises its own internal clock to correspond with the global time of the satellite. In this manner, the internal clock of all base transceiver stations in the network are made to show exactly the same time, whereby the frames can be transmitted exactly at the same time from the different base transceiver stations of the network.

This solution is simple to implement and the network synchronisation which can be achieved is exact. Economically, the implementation is expensive, because it requires a considerable number of location measurement units. Considered in the long term, the solution is advantageous, since the synchronisation does not require separate purchases of equipment just to do with the synchronisation, but the implementation can use the same equipment as that which is used for the localisation of mobile stations.

In accordance with a second embodiment of the invention, the location measurement unit is installed at some base transceiver station sites. In this implementation, the location measurement unit measures the synchronisation difference of frame broadcasts from the base transceiver station of its place of location and from adjacent base transceiver stations. It transmits the real time difference, which it has measured, along with time stamped frame numbers by way of the base transceiver station to the base station controller. The base station controller calculates the tuning values of the clock and changes the frame number of each base transceiver station, so that each base transceiver station will use the correct frame number and so that the real time differences between different base transceiver stations are minimised.

Since in this implementation there are considerably less location measurement units, this solution in comparison with the previous one is economically more advantageous, considered in the short term. However, its manner of solution is more complicated and less accurate from the viewpoint of synchronisation.

With the implementation according to the invention, considerable advantages are achieved both in economical and functional terms, e.g. the capacity can be increased by as much as 50-300%, depending on the manner of implementation.

LIST OF FIGURES

In the following, the invention will be described in greater detail with the aid of the appended diagrammatic figures, of which

DETAILED DESCRIPTION OF THE INVENTION

The mobile station localisation function in a mobile network can be implemented with the aid of a Location Measurement Unit (LMU).

Figure 3:
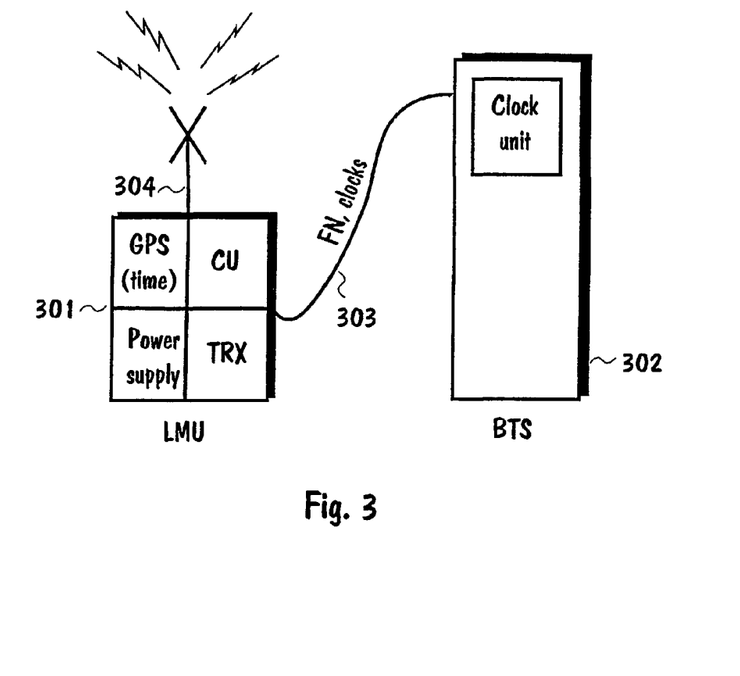
FIG. 3 illustrates a location measurement unit in accordance with the invention and its connection.

FIG. 3 illustrates diagrammatically a location measurement unit 301 and its connection to a Base Station (BTS) 302.

The location measurement unit includes e.g. an antenna 304 and a GPS receiver for receiving GPS signals from satellites orbiting the earth. In addition, it includes a transceiver consisting of a transmitter TX and a receiver RX for data transmission over the air interface, a control unit CU, which performs calculation and controls the logic of the location measurement unit as well as the power supply. The output gate of the location measurement unit is connected by a cable 303 to the input gate of the base station's clock unit.

Figure 4:
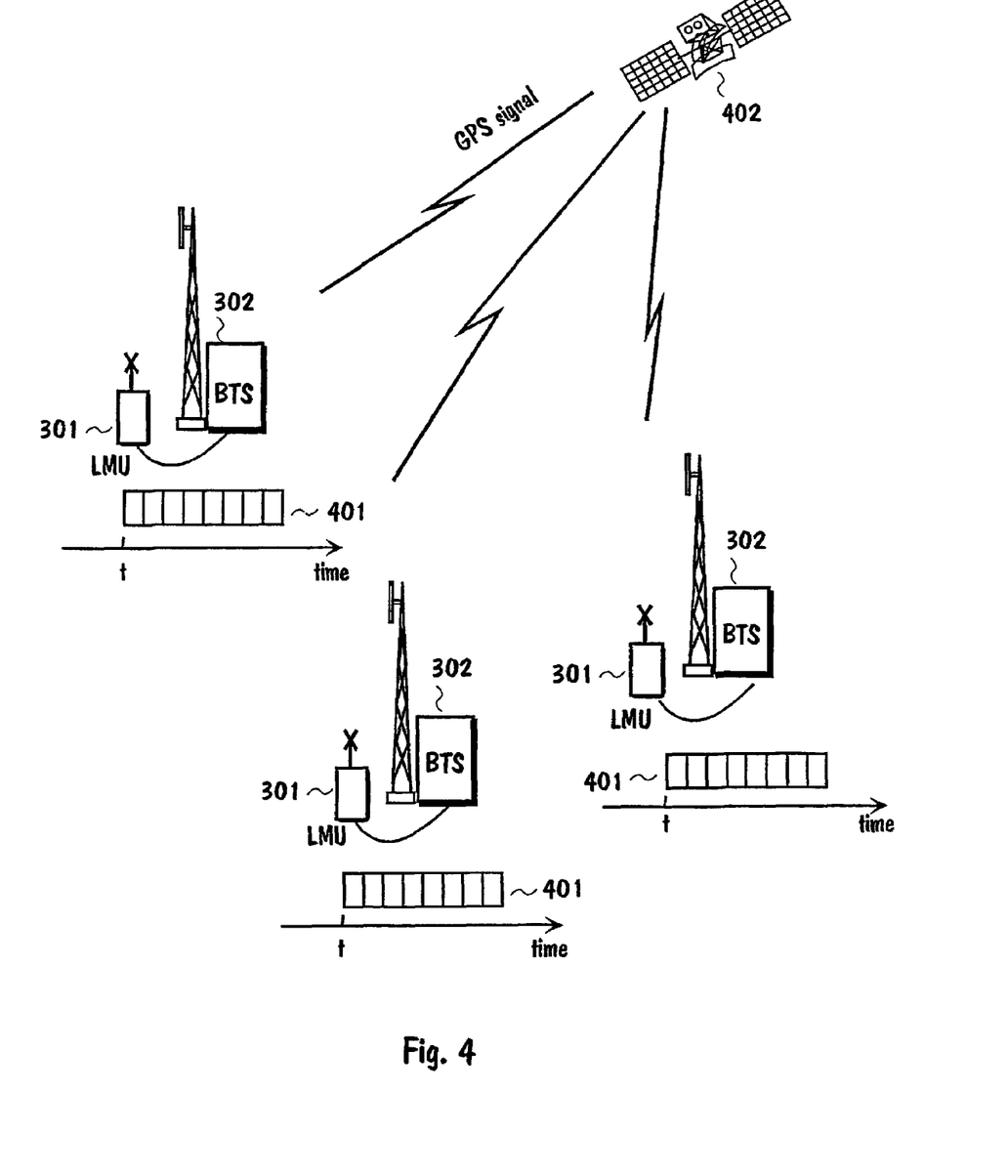
FIG. 4 shows an arrangement in accordance with the invention.

FIG. 4 illustrates a situation, wherein location measurement unit 301 receives a GPS signal transmitted by satellite 402 orbiting the earth. From the message the location measurement unit separates a clock, with the global time of which it synchronises its own internal clock. In a simplified manner the figure shows only one satellite, but normally the GPS receiver detects simultaneously at least four satellites orbiting the earth. The GPS receiver integrated into the location measurement unit is fixed, so that its exact geographical location is known. Likewise, the location coordinates of each base station in the network are known.

From the exact GPS time received from the satellites the location measurement unit forms the GMS system's frame number FN and frame clock FCLK, which are relayed further to the base station 302. The base station synchronises its own internal clock with the time transmitted by the location measurement unit, whereby each base station of the network can transmit frames 401 over the air interface at the same moment t.

Synchronisation of the network may be implemented e.g. in such a way that a location measurement unit is located at all base station sites, or alternatively so that a location measurement unit is located at some base station sites only. These embodiments will be examined in the following by way of examples.

First Embodiment of the Invention

Figure 5:
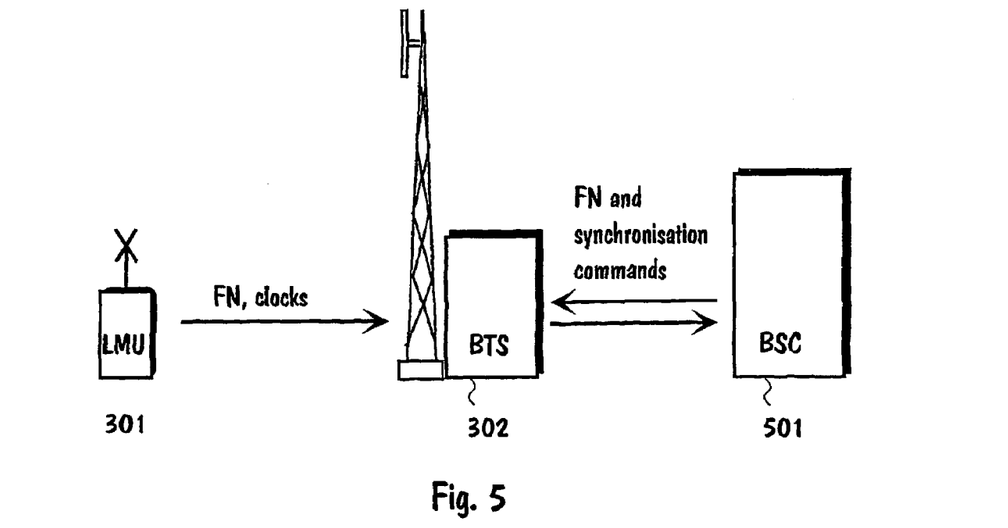
FIG. 5 illustrates a solution in accordance with a first embodiment of the invention.

FIGS. 4 and 5 illustrate an implementation of the invention wherein a location measurement unit is installed at all base station sites. In this embodiment the location measurement unit functions as the master clock of the base station site.

In FIG. 5, the location measurement unit 301 emulates a so-called talk base station functioning as master in the synchronisation. The location measurement unit and the base station are connected to each other by a cable in the manner described in the foregoing. The certain GPS time received by the location measurement unit from the satellite represents a point of reference, from which the frame number begins, that is, FN=0, and the frame clock FCLK starts (the clock's edge). The location measurement unit transmits a 24-bit long frame number and a frame clock (e.g. 217 Hz) to the base station. Besides the frame clock, also other clock information may be transmitted when required, of which the TCLK (rimeslot Clock) synchronising the time slots of the frame and/or the SBCK (Serial Bus Clock) for use at the applicant's talk base stations may be mentioned as examples. The base station synchronises its clock according to the frame clock. Every location measurement unit and base station in the network functions in a similar manner. Since the exact global GPS time is available to every base station in the network, the base stations can transmit frames exactly at the same time, in other words, they can function in mutual synchrony. The Base Station Controller BSC 501 only manages phasing of the frames, e.g. by providing the base station with synchronisation commands.

Since each base station in the network is sending frames in the synchronised network at the same time, the base station controller is able to calculate on a time slot basis which channel ought to be allocated at each time. In practice, the aim is to allocate such a frequency for the mobile station, whose C/I, that is, Carrier over Interface ratio, is good enough. This means that the quality of speech or data transmission is good, in other words, the subscriber notices no interference in the call.

In practical implementations, base stations of several sizes and models and installed at different times may be located side by side on the base station site. Hereby it is unprofitable economically to install an own location measurement unit separately at each base station. On the other hand, it is more advantageous to chain the base stations with each other and to install only one location measurement unit as the master clock for the chained base stations.

Figure 6:
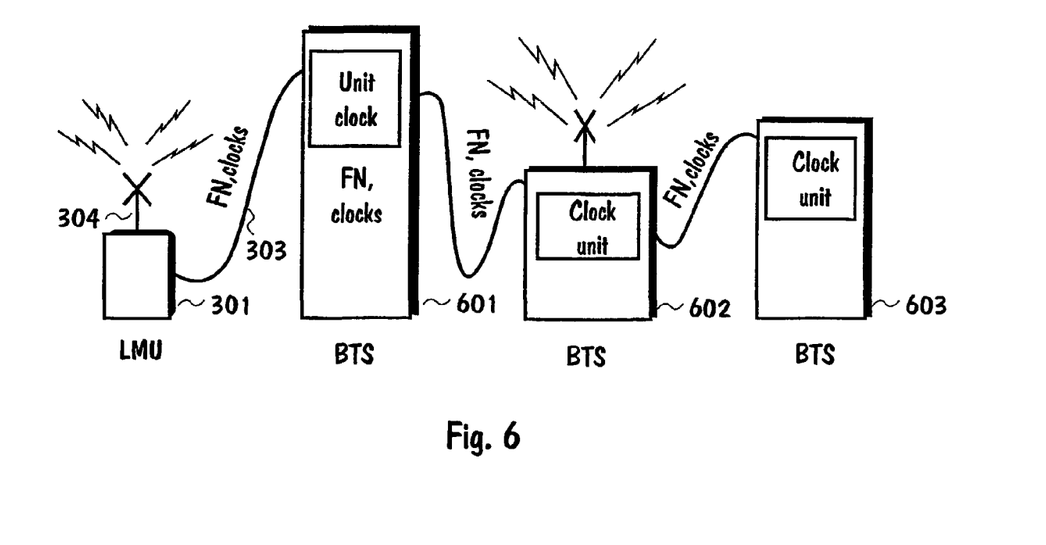
FIG. 6 illustrates a solution in accordance with a first embodiment of the invention.

FIG. 6 illustrates a situation, wherein there are several different base stations 601-603 on the base station site. Location measurement unit 301 is the master clock of the base station site. Chaining of base stations means that the output gate of the clock unit of the first base station 601 is connected functionally by cable 303 to the input gate of the clock unit of the second base station 602 and, further, the output gate of the said clock unit is connected functionally by a cable to the input gate of the clock unit of the third base station 603.

The location measurement unit transmits the frame number and clock information to the clock unit of the first base station. This synchronises itself according to the information it has received and transmits the information forward to the following base station, etc. Of course, the chaining will cause a delay in the clock. Since the distances between base stations are short, that is, the connecting cables between them are short, the delays are rather small and it is simple to correct them. There are different methods for correcting delays. One method is to correct a time delay in such a way that the transmitting base station adds the correction value of the clock to the frame number and clock information. On the other hand, the correction value may be stored in the memory of the receiving base station, from which the receiving clock unit will pick the value and add it to the clock time obtained from the preceding base station.

The antenna 304 of the location measurement unit causes longer time delays than those mentioned above, because its distance from the unit is longer than the lengths of base station cables. However, like the previous delays, the one caused by the antenna can be calculated, because the parameters causing delays are known: The correction value of the delay caused by the antenna can be added to the frame number and clock information in the location measurement unit.

Second Embodiment of the Invention

With the aid of FIGS. 7 and 8 such an embodiment according to the invention is studied in the following, wherein a location measurement unit is provided only on some base station sites. Since the embodiment requires much less units, it is of course also much cheaper to implement than the former. However, in a functional comparison with the former it is complicated and requires more calculation.

Figure 7:
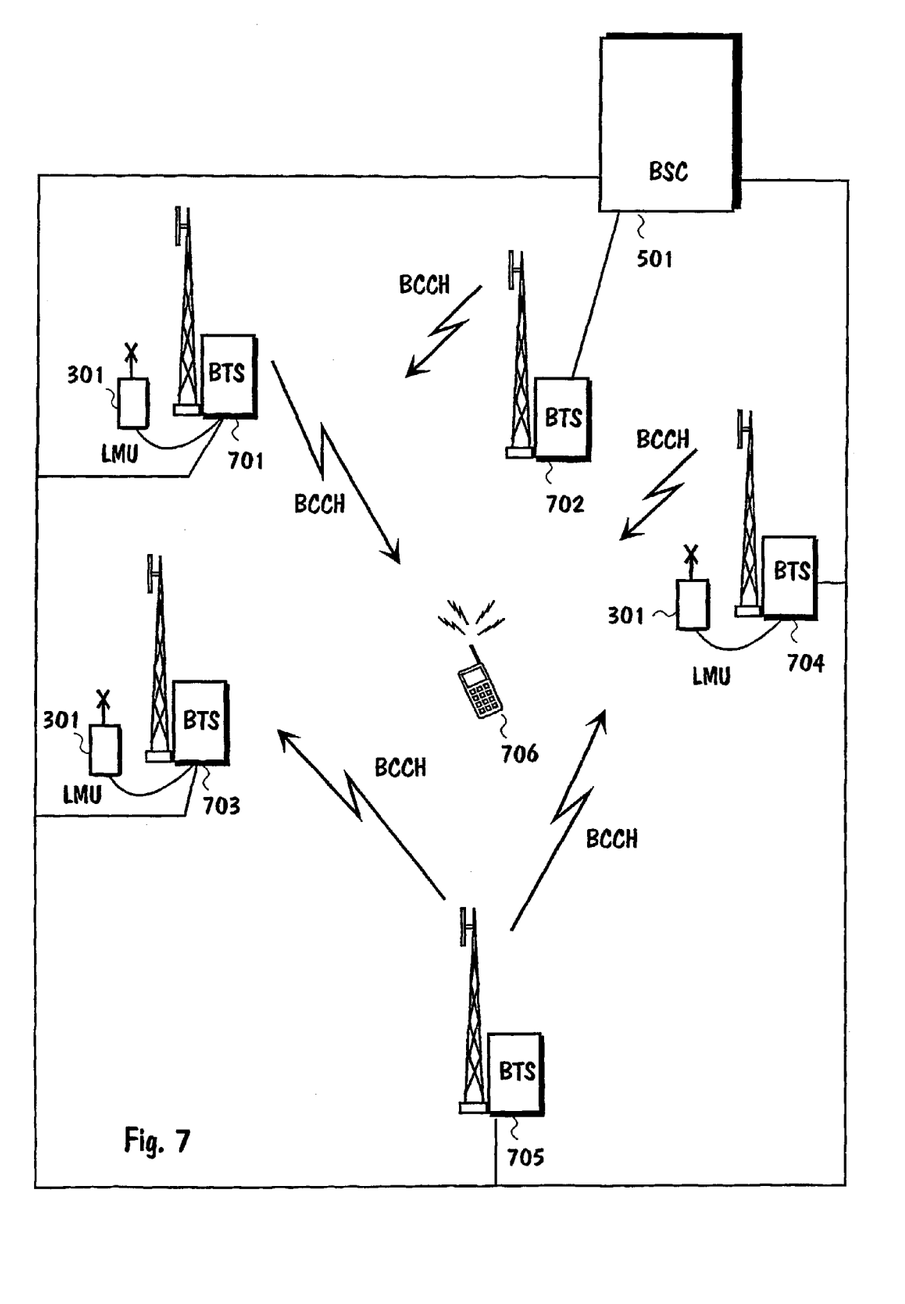
FIG. 7 shows an arrangement in accordance with a second embodiment of the invention.
Figure 8:
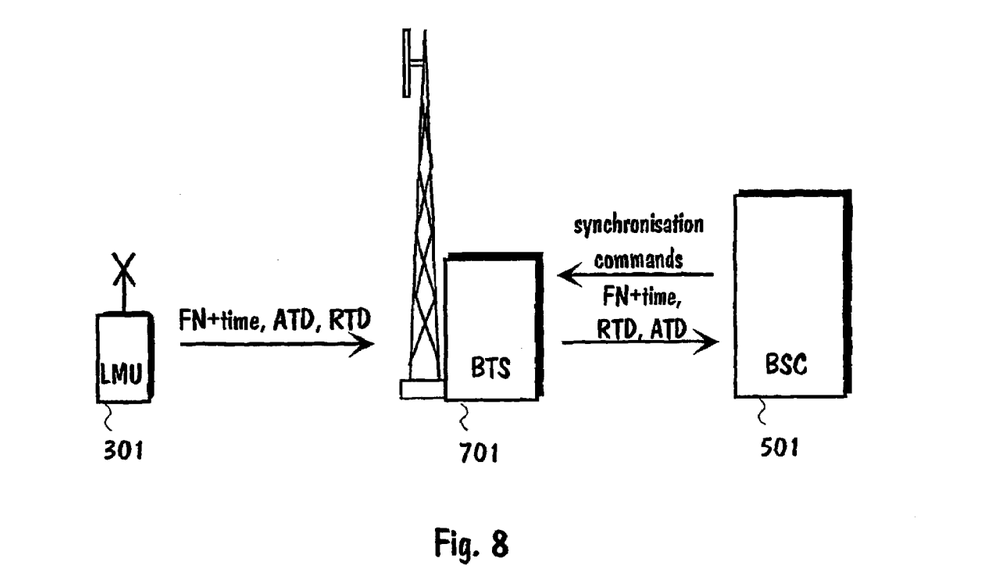
FIG. 8 illustrates a solution in accordance with a second embodiment of the invention.

FIG. 7 illustrates a situation, wherein location measurement unit 301 is located in connection with base stations 701, 703 and 704. Base stations 702 and 705 have no location measurement unit. The base stations are constantly broadcasting information about themselves on the Broadcast Control Channel BCCH. Mobile station 706 is connected over the radio path with one of the base stations shown in the figure, e.g. with base station 704. The base station controls the operation of the mobile station e.g. by providing the synchronisation and by stating the transmission power to be used by the mobile station. In state-of-the-art solutions, a hierarchical or plesiochronous synchronisation is usually used, whereby the base station receives the synchronisation signal from the base station controller and the base station controller for its part receives the synchronisation signal from the mobile services switching centre, etc. A public telephone system and radio system are usually synchronised at their topmost level as accurately as possible with an atomic clock. The synchronisation signal, which is e.g. a signal with a nominal frequency of about 2 MHz, can be relayed from the base station controller to the base station along a separate cable or over the radio path. This method of synchronisation means that the base stations are not exactly mutually synchronised, for which reason each base station transmits the own timing information of its cell on the above-mentioned BCCH channel.

The geographical locations of both the location measurement unit and the base stations are accurately known. The location measurement unit measures the broadcasting of base stations in the same manner as the mobile station does. Since the distance travelled by signals broadcast by base stations is accurately known, the location measurement unit is able from the measurement information to calculate the relative so-called real time difference RTD of frame broadcasts by base stations. FIG. 8 illustrates a situation wherein location measurement unit 301 broadcasts the real time difference and the time-stamped frame number to base station 701. It broadcasts this information both to its own base station and to adjacent base stations 702-705, which information is broadcast further to base station controller 501. When the real time difference RTD is combined with the global positioning system GPS, the Absolute Time Difference ATD will result.

On the basis of information received from the location measurement units of base stations 701, 703 and 704 a calculation unit integrated into the base station controller calculates clock tuning values for base stations 702 and 705. In case the base station tuning is not correct, the base station controller sends a command either to slow down or to speed up the clock for so long a time that the relative real time difference is zero, RTD=0. In addition, it controls that each base station has the same frame number or that adjacent base stations have only a minor phase difference in their frame numbers. The calculation of the real time difference and of tuning values is a continuous process demanding much calculation.

It was assumed in the examples described above, that the functionality of location calculation is integrated in the base station controller. The Serving Mobile Location Centre SMLC may also be a separate unit in the Base Station System BSS, whereby the measurement reports on measurements made by the location measurement unit are broadcast to it by way of the base station controller.

The SMLC has real-time information at all times about the network's real time difference. Certain external applications, e.g. the authorities, may request information about the SMLC through the Gateway Mobile Location Centre GMLC, which allows access for a third party to the subscriber's location information in the mobile network.

The drawings and the explanation relating to them are only intended to illustrate the inventive idea. The synchronisation of frame broadcasts at the air interface in accordance with the invention may vary in details. The implementation of equipment needed in the system may also vary. In the examples, the location measurement unit was connected by cables to the base transceiver station, but it may alternatively be integrated directly into the base transceiver station. It can also be located as a separate unit in such a way that it is in connection with the base station through the air interface. However, this alternative is not recommended, because the accuracy of clocks will suffer essentially.

It was said in the foregoing that the GPS receiver contained in the location measurement unit is used for receiving an accurate reference clock in order to synchronise the base station clocks. However, it may also be used for location determination e.g. in order to check the position of the location measurement unit. The correct and accurate position information of the location measurement unit is important e.g. to the base station controller, since it calculates position information. And it is also important to those other units of the network, which calculate position information.

The location measurement unit supports the synchronisation and other positioning methods of the base station system, e.g. Enhanced Observed Time Difference E-OTD. As the SMLC has real-time information on the network's real time difference, the mobile station can be located by the E-OTD method in a non-synchronised network by utilising the information of measurement reports broadcast by the location measurement units. The SMLC hereby requests real time differences reported by the LMUs and calculates the location of the mobile station with the aid of OTD values measured and reported by the mobile station.

One of the advantages of the synchronised network is that it alleviates the problem of decoding the signal broadcast by the base station, which contains base station identification information, and allows use of many such applications, which cannot be implemented in a non-synchronised network. Dynamic allocation of frequencies and channels can be mentioned as an example.

The accurate global clock needed by base stations for synchronisation of broadcasts over the air interface may also be another clock than one broadcast by satellites. The main thing is that the base stations can synchronise reliably their own internal clock with a certain global time.

Although the invention was explained above mainly in connection with a mobile system, synchronisation of frame broadcasts can be used also for a telecommunications system of some other kind, when frame broadcasts are broadcast and received over the air interface in the telecommunications system. The method and system according to the invention can be implemented either in the entire telecommunications network or in a part of the telecommunications network, e.g. in such an area only, which covers a certain town.

The invention claimed is:

1. Method of synchronizing base transceiver stations in a mobile communications network, said method comprising:
   receiving a signal including an external system accurate clock;
   measuring a real time difference (RTD) of broadcast signals from at least one base transceiver station and from at least one adjacent base transceiver station;
   transmitting the measured RTD, whereby the base transceiver stations are synchronized in accordance with the measured RTD;
   providing a frame clock and a base station frame number within the clock information transmitted by the location measurement unit to the at least one base transceiver; and
   defining the frame clock with the aid of the external clock.

2. The method as defined in claim 1, further comprising:
   providing a plurality of base transceiver stations;
   connecting together said plurality of base transceiver stations to form chained based transceiver stations;
   operating the location measurement unit as a master clock of the chained base transceiver stations; and
   synchronizing the chained base transceiver stations with identical clock information.

3. Method of synchronizing base transceiver stations, the method comprising:
   receiving a signal including an external system accurate clock;
   transmitting a clock information of the signal to a base transceiver station of at least one base station site;
   synchronizing the base transceiver station in accordance with the clock information;
   determining whether the at least one base station includes an inoperative location measurement unit;
   synchronizing the base transceiver station of the inoperative measurement unit using a location measurement unit from an adjacent base station site; providing a frame clock and a base station frame number within the clock information transmitted by the location measurement unit to the at least one base transceiver; and
   defining the frame clock with the aid of the external clock.

4. The method as defined in claim 3, further comprising:
   transmitting the clock information to a location calculation unit.

5. The method as defined in claim 4, further comprising:
   receiving, at the location measurement unit, frames transmitted by the at least one base transceiver station;
   attaching to the frames a time stamp based upon the external system accurate clock; and
   transmitting the time stamped frames together with the clock information.

6. The method as defined in claim 5, further comprising:
   transmitting the clock information and the time stamped frames from the at least one base transceiver station to the location calculation unit.

7. The method as defined in claim 6, further comprising:
   reporting a real time difference from the location calculation unit to a base station controller, wherein the base transceiver station controller manages and control a clock phasing of the at least one base station transceiver station having no location management unit; and
   transmitting a clock tuning value from the location calculation unit to the at least one base transceiver station having no location management unit.

8. The method as defined in claim 4, further comprising:
   locating the location calculation unit in a base station system.

9. The method as defined in claim 3, further comprising:
   receiving, at the location measurement unit, the clock information including the external accurate clock transmitted from a satellite orbiting the earth.

10. The method as defined in claim 3, further comprising:
    providing the location measurement unit as a component within the at least one base transceiver station.

11. The method as defined in claim 3, further comprising:
    providing the location measurement unit as a separate component in the at least one base station.

12. A mobile communications system comprising:
    a plurality of mobile stations connected to at least one base station site;
    the at least one base station site including at least one base transceiver station having radio interface, wherein said radio interface having a frame structure formed by transmission frames and reception frames;
    a base station controller for controlling the frame transmissions of the at least one base transceiver stations;

a location measurement unit connected to the at least one base transceiver station;

wherein the location measurement unit includes a receiver for receiving an external system accurate clock, a reception device for receiving the transmission frames of the base transceiver station of at least one adjacent base station site, and a processor for processing clock information and the transmission frames and for transmitting the clock information and the transmission frames to the base transceiver; and a frame clock and a base station frame number within the clock information transmitted by the location measurement unit to the at the least one base transceiver station, wherein the frame clock is defined with the aid of the external clock.

13. A mobile communications system comprising:

a receiver configured to receive a signal including an external system accurate clock;

a location measurement unit configured to measure a real time difference (RTD) of broadcast signals from at least one base transceiver station and from at least one adjacent base transceiver station;

a transmitter configured to transmit the measured RTD, whereby the base transceiver stations are synchronized in accordance with the measured and a frame clock and a base station frame number within the clock information transmitted by the location measurement unit to the at the least one base transceiver station, wherein the frame clock is defined with the aid of the external clock.

14. A mobile communications system comprising:

a receiver configured to receive a signal including an external system accurate clock;

a transmitter configured to transmit a clock information of the signal to a base transceiver station of at least one base station site;

a first synchronizer configured to synchronize the base transceiver station in accordance with the clock information;

a controller configured to determine whether the at least one base station includes an inoperative location measurement unit;

a second synchronizer configured to synchronize the base transceiver station of the inoperative measurement unit using an location measurement unit from an adjacent base station site; and a frame clock and a base station frame number within the clock information transmitted by the location measurement unit to the base station transceiver station, wherein the frame clock is defined with the aid of the external clock.

15. A location measurement apparatus, comprising:

a receiver configured to receive a signal including an external system accurate clock;

a measurement unit configured to measure a real time difference of broadcast signals from at least one base transceiver station and from at least one adjacent base transceiver station;

a transmitter configured to transmit the measured real time difference, wherein the base transceiver stations are synchronized in accordance with the measured RTD; and a frame clock and a base station frame number within the clock information transmitted by the measurement unit to the at least base transceiver station, wherein the frame clock is defined with the aid of an external clock.

16. An apparatus, comprising:

a transmitter configured to transmit a measured real time difference of broadcast signals from at least one base transceiver station and from at least one adjacent base transceiver station, wherein the base transceiver stations are synchronized in accordance with the measured real time difference; and a frame clock and a base station frame number within the clock information transmitted by a location measurement unit to the at the least one base transceiver station, wherein the frame clock is defined with the aid of an external clock.

17. An apparatus, comprising:

a receiver configured to receive a signal including an external system accurate clock;

a location measurement unit configured to measure a real time difference of broadcast signals from two adjacent base transceiver stations; and a frame clock and a base station frame number within the clock information transmitted by a location measurement unit to at least one of the base transceiver stations, wherein the frame clock is defined with the aid of the external clock.

* * * * *